United States Patent [19]

Sproule

[11] Patent Number: 5,446,503
[45] Date of Patent: Aug. 29, 1995

[54] VERTICAL DETAIL ENHANCEMENT WITH STEPPED RETURN CORING

[75] Inventor: Patrick Sproule, Raleigh, N.C.

[73] Assignee: Mitsubishi Semiconductor America, Inc., Durham, N.C.

[21] Appl. No.: 225,690

[22] Filed: Apr. 11, 1994

[51] Int. Cl.⁶ .......................... H04N 5/208
[52] U.S. Cl. ........................ 348/628; 348/627; 348/712
[58] Field of Search .............. 348/252, 606, 628, 627, 348/673, 712, 711; H04N 5/208

[56] References Cited

U.S. PATENT DOCUMENTS

| | | | |
|---|---|---|---|
| 4,081,836 | 3/1978 | Skinner | 358/166 |
| 4,090,217 | 5/1978 | Goyal et al. | 358/37 |
| 4,263,616 | 4/1981 | Lee | 348/627 |
| 4,268,864 | 5/1981 | Green | 348/627 |
| 4,386,434 | 5/1983 | Gibson et al. | 348/627 |
| 4,509,080 | 4/1985 | Lagoni et al. | 358/166 |
| 4,536,796 | 8/1985 | Harlan | 358/166 |
| 4,558,352 | 12/1985 | Sauer | 358/31 |
| 4,571,511 | 2/1986 | Dischert et al. | 307/547 |
| 4,825,297 | 4/1989 | Fuchsberger et al. | 358/166 |
| 4,855,829 | 8/1989 | Kihara | 348/627 |
| 4,899,221 | 2/1990 | Miller | 358/166 |
| 4,912,551 | 5/1990 | Ozaki | 358/166 |
| 4,997,398 | 3/1991 | Glen | 440/88 |
| 5,032,909 | 7/1991 | Sato et al. | 348/606 |
| 5,043,802 | 8/1991 | Tarumizu et al. | 358/36 |
| 5,146,319 | 9/1992 | Engel et al. | 358/39 |
| 5,177,600 | 1/1993 | Monta et al. | 358/37 |
| 5,210,610 | 5/1993 | Kanashiki et al. | 358/169 |
| 5,220,624 | 6/1993 | Sakamoto et al. | 358/166 |
| 5,241,372 | 8/1993 | Ohba | 358/166 |
| 5,243,427 | 9/1993 | Yu | 358/166 |
| 5,245,327 | 9/1993 | Pleva et al. | 358/166 |

Primary Examiner—James J. Groody
Assistant Examiner—Jeffrey S. Murrell
Attorney, Agent, or Firm—Lowe, Price, LeBlanc & Becker

[57] ABSTRACT

In the digital processing of video signals, a vertical detail enhancement system is provided that has a transfer characteristic with a transitional region between a coring region and an active region split into three steps. The slopes of the first, second and third step regions are 25%, 50% and 75% of the enhancement gain, respectively. The levels of enhancement in the step regions are set at 25%, 50% and 75% of the level of enhancement in the active region. A vertical detail signal is compared with a coring level selected by a coring multiplexer among a plurality of hardcoded coring levels to set a coring point at the transfer characteristic. Then, the vertical detail signal is successively compared with the coring level incremented by the selected widths of the step regions to control a step choice unit defining a required attenuation of the vertical detail signal value. A paring level is selected by a paring multiplexer among a plurality of hardcoded paring levels.

22 Claims, 3 Drawing Sheets

VERTICAL DETAIL ENHANCEMENT WITH STEPPED RETURN CORING

TECHNICAL FIELD

The present invention relates generally to processing vertical detail signals in image reproduction, and more particularly, to a method of and system for vertical detail enhancement with stepped return coring.

BACKGROUND ART

In a color television system, the luminance and chrominance components of a composite video signal may be separated from each other by means of a digital comb filter. To improve the quality of received pictures, it is desirable to enhance vertical transitions (details) of the luminance signal derived from the output of the comb filter. Vertical detail signals to be enhanced are generated by element-by-element comparing the luminance data on the current horizontal line of a video signal shown in FIG. 1 with the luminance data on the horizontal lines immediately preceding and following it. The vertical detail values are increasingly positive on bright-to-dark transitions between top and bottom lines. Conversely, they are increasingly negative on dark-to-bright transitions between top and bottom lines.

FIG. 2a illustrates basic enhancement of the vertical detail signal, and FIG. 2b shows a block-diagram of the circuit that implements the basic vertical detail enhancement. As depicted in FIG. 2b, a comb filter 42 filters a composite video signal to separate luminance and chrominance components. A vertical detail processing unit 44 processes the previous, current and following horizontal lines shown in FIG. 1 to generate vertical detail signals. To supply the processing unit with the data in the three successive lines, the composite video signal is delayed by periods equal to the duration of one and two horizontal lines, i.e. 63.55 ms and 127.10 ms, respectively, for the NTSC standard, using delay units 46, each of which provides delay by one line width. The resultant vertical detail signal is amplified by a variable-gain amplifier 48 and is added by an adder 50 to the luminance output of the comb filter 42 to generate the enhanced luminance signal.

The adjustable slope of the transfer characteristic in FIG. 2a defined by the gain of the amplifier 48 determines the amount of enhancement per unit of vertical detail magnitude in both positive and negative directions. To eliminate the enhancement of noise, small amplitude excursions of the luminance signal may be removed by means of a process commonly referred to as "coring". This may be accomplished by means of a circuit for modifying the vertical detail signals having a transfer characteristic shown in FIG. 3, wherein no amplification is provided in a low amplitude region of the vertical detail signal (coring region). Further, gain above a certain level is either undesirable or unrequired. Accordingly, the transfer characteristic in FIG. 3 may be modified to restrict amplification in a high level gain region (paring region).

As shown in FIG. 4a, while small noise is cored out, larger noise that exceeds the coring level is amplified. To reduce the enhanced noise amount, a transfer curve shown in FIG. 4b should be generated, wherein a slower slope is provided in a transition region 64 between the coring region 62 and active region 66.

Accordingly, it would be desirable to provide a digital vertical detail enhancement system having the transfer characteristic with a lower slope in the transition region to reduce amplification of noise exceeding the coring level.

Further, it would be desirable to provide an adjustable coring level to suppress noise at different predicted levels and to provide an adjustable paring level and width of the transition region to customize the transfer characteristic.

DISCLOSURE OF THE INVENTION

Accordingly, one advantage of the invention is in providing a digital vertical detail enhancement system having the transfer characteristic with a lower slope in the transition region to reduce amplification of noise exceeding the coring level.

Another advantage of the invention is in providing an adjustable coring level to suppress noise at different predicted levels.

A further advantage of the invention is in providing adjustable paring level and width of the transition region to customize the transfer characteristic.

Still another advantage of the invention is in providing the transfer characteristic of a digital vertical detail enhancement system having the stepped transition region with customized widths and slopes of the steps.

The above and other advantages of the invention are achieved, at least in part, by providing apparatus for enhancing a luminance component of a video signal that comprises means for supplying a vertical detail signal representative of variations in the luminance of the video signal in successive horizontal scan lines. The supplied vertical detail signal is processed by processing means to form a modified signal having an amplitude represented by a sequence of steps with variable slopes. The output of the processing means is added to the luminance component to generate an enhanced luminance signal.

In accordance with a preferred embodiment of the invention, the processing means comprises coring means responsive to a supplying means for suppressing the vertical detail signal having an amplitude lower than a first predetermined level. The first modifying means attenuates by a first predetermined value the vertical detail signal having an amplitude higher than the first predetermined level but lower than a second predetermined level. The second modifying means attenuates by a second predetermined value the vertical detail signal having an amplitude higher than the second predetermined level but lower than a third predetermined level. The third modifying means attenuates by a third predetermined value the vertical detail signal having an amplitude higher than the third predetermined level but lower than a fourth predetermined level. The vertical detail signal having an amplitude higher than the fourth predetermined level but lower than a fifth predetermined level is passed without modification. Finally, the vertical detail signal having an amplitude higher than the fifth predetermined level is restricted by paring means. The first modification means supplies a modified signal having an amplitude equal to 25% of that of the vertical detail signal to form a first step of the sequence of steps. The second modification means supplies a modified signal having an amplitude equal to 50% of that of the vertical detail signal to form a second step of the sequence of steps. The third modification means supplies a modified signal having an amplitude equal to 75% of that of the vertical detail signal to form a third step of the sequence of steps. Comparing means is provided to compare the amplitude of the vertical detail signal with the predetermined levels selected by selecting means among a plurality of preset levels.

In accordance with one aspect of the invention, a digital video signal processor comprises a source of vertical detail signals representative of contrasts between successive horizontal lines of a video signal, and a translating circuit coupled to the source for modifying the vertical detail signals. A control circuit supplies the translating circuit with a predetermined coring level to eliminate the vertical detail signals having an amplitude lower than the coring level, with a predetermined paring level to restrict the value of the vertical detail signals having an amplitude higher than the paring level, and with predetermined step levels between the coring level and the paring level to reduce the value of the vertical detail signals having an amplitude lower than the predetermined step levels. The control circuit may comprise an adjustment circuit for adjusting the predetermined coring and paring levels.

In the preferred embodiment, the predetermined step levels include a first level higher than the coring level, a second level higher than the first level, and a third level higher than the second level but lower than the paring level. The output signal of the translating circuit comprises a first step when the amplitude of the vertical detail signals is higher than the coring level but lower than the first level, a second step when the amplitude of the vertical detail signals is higher than the first level but lower than the second level, and a third step when the amplitude of the vertical detail signals is higher than the second level but lower than the third level. The slope of the second step is higher than the slope of the first step but lower than the slope of the third step.

In accordance with the method of this invention, the following steps are carried out to process a vertical detail signal representative of contrasts between successive horizontal lines of a video signal:

suppressing the vertical detail signal having amplitude lower than a predetermined coring level, restricting the vertical detail signal having an amplitude higher than a predetermined paring level, transforming the vertical detail signal having an amplitude higher than a predetermined coring level but lower than a maximum step level into a step-like modified signal having a plurality of step components with variable amplitudes, the maximum step level being lower than the paring level, and passing without modification the vertical detail signal having an amplitude higher than the maximum step level but lower than the paring level.

Preferably, the step of transforming comprises:

forming a first of the step components when the vertical detail signal has an amplitude lower than a first step level, forming a second of the step components when the vertical detail signal has an amplitude higher than the first step level but lower than a second step level, and forming a third of the step components when the vertical detail signal has an amplitude higher than the second step level but lower than the maximum step level.

Preferably, the amplitude of the second of the step components is higher than the amplitude of the first of the step components but lower than the amplitude of the third of the step components. The amplitude of the vertical detail signal is higher than the amplitude of the third of the components. The coring and paring levels, as well as first and second step levels may be adjusted.

Still other advantages of the present invention will become readily apparent to those skilled in this art from the following detailed description, wherein only the preferred embodiment of the invention is shown and described, simply by way of illustration of the best node contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BEST MODE FOR CARRYING OUT THE INVENTION

Figure 5:
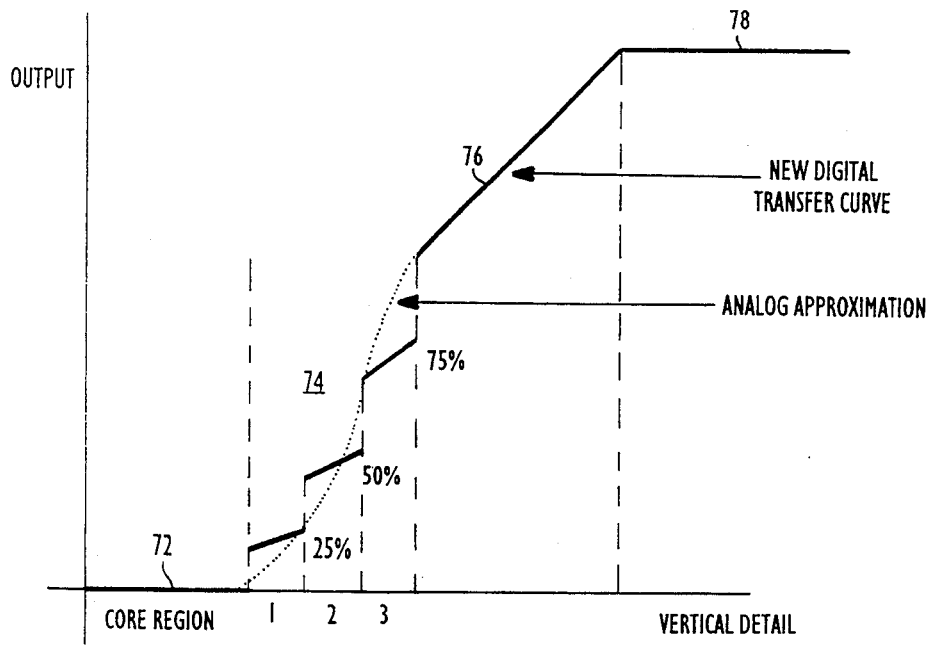
FIG. 5 shows the transfer characteristic of a digital circuit for modifying vertical detail signals in accordance with the present invention.

Referring to FIG. 5 of the drawings, wherein the transfer characteristic of a digital circuit for modifying vertical detail signals is shown, the best mode for practicing the invention is based in part on the realization that a transition region 74 between a coring region 72 and an active region 76 is split into three steps. As the final gain of the vertical detail enhancement system is determined by the final gain circuit (e.g. by gain amplifier 48 shown in FIG. 2b), the vertical detail modifying circuit may operate on a unit gain. Accordingly, the value of the output signal of the modifying circuit in the active region 76 is equal to the value of the vertical detail signal supplied to the circuit, and the slope of the transfer characteristic in the active region is equal to 45°. To simplify the logic realization of the modifying circuit, the output level in the step regions 1, 2 and 3 may be respectively set to 25%, 50% and 75% of the vertical detail signal value. Also, the slopes of the transfer characteristic in the step regions 1, 2 and 3 may be respectively set to 25%, 50% and 75% of the slope in the active region 76. As represented by a paring region 78, the output of the modifying circuit may be limited by a paring level.

Figure 1:
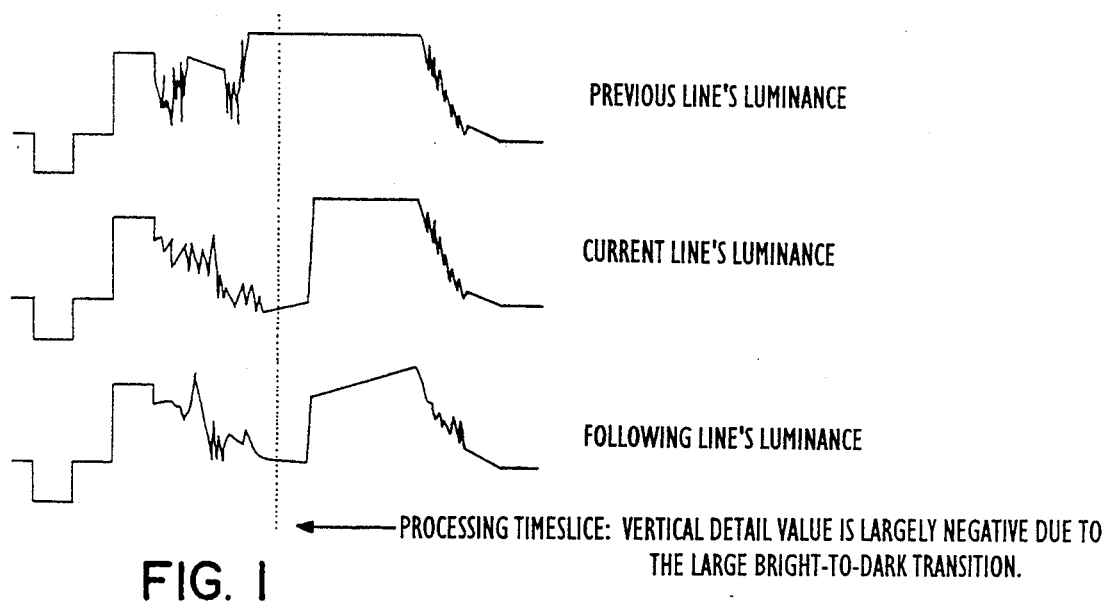
FIG. 1 illustrates vertical detail processing.
Figure 2A:
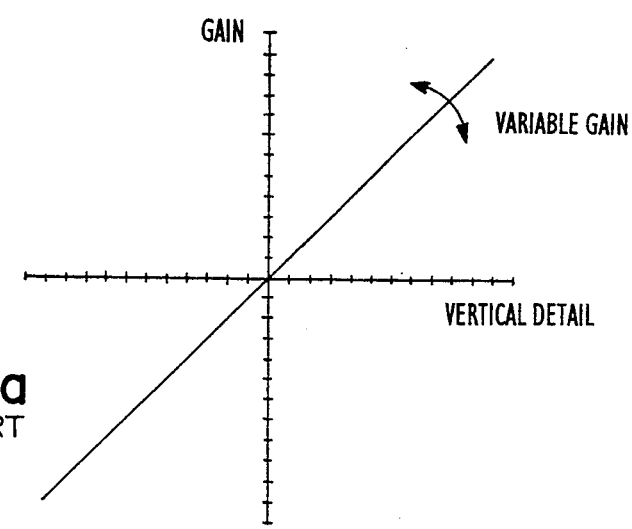
FIG. 2a illustrates basic enhancement of the vertical detail signal.
Figure 2B:
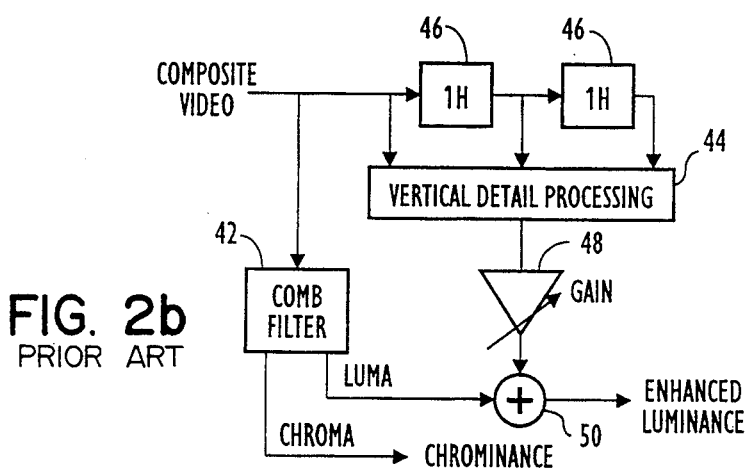
FIG. 2b shows a block-diagram of the prior art circuit that implements the basic vertical detail enhancement.
Figure 3:
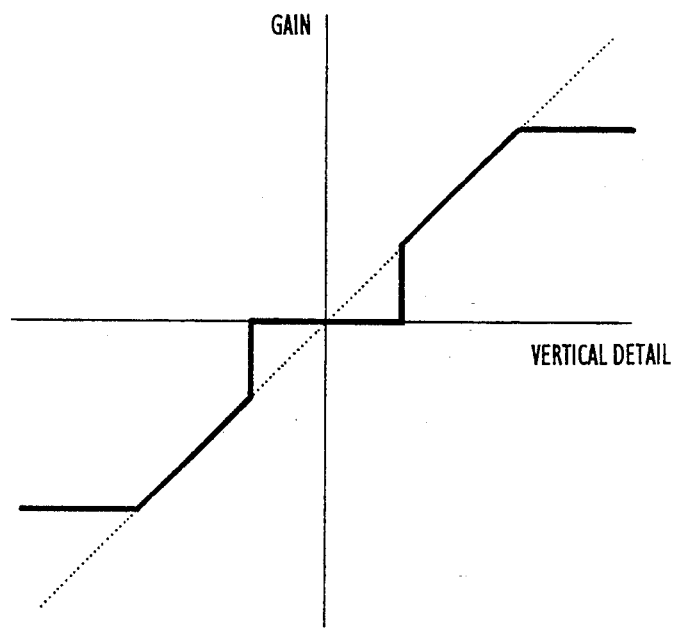
FIG. 3 illustrates the transfer characteristic of an vertical detail enhancement system with coring and paring.
Figure 4A:
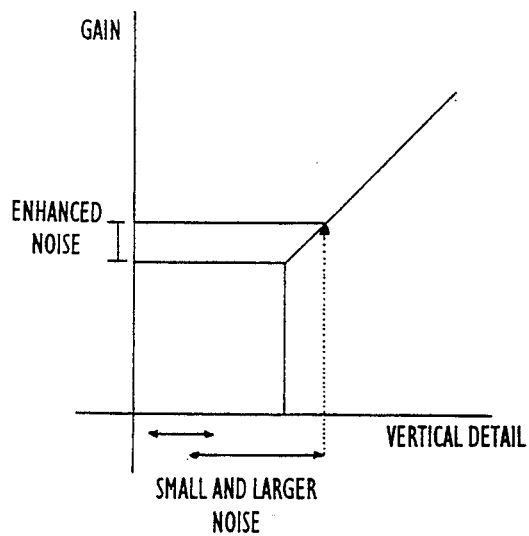
FIGS. 4a and 4b illustrate enhancing noise that exceeds a coring level.
Figure 4B:
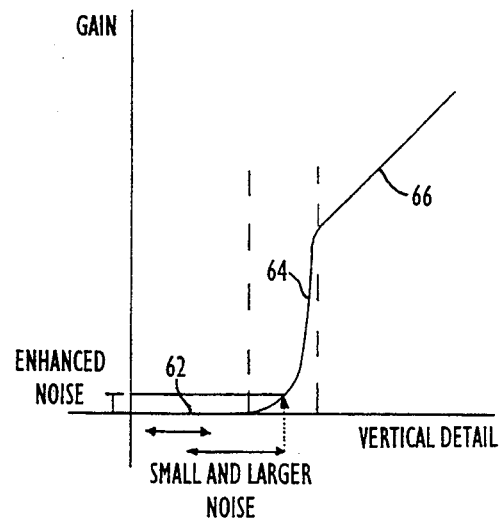
Figure 6:
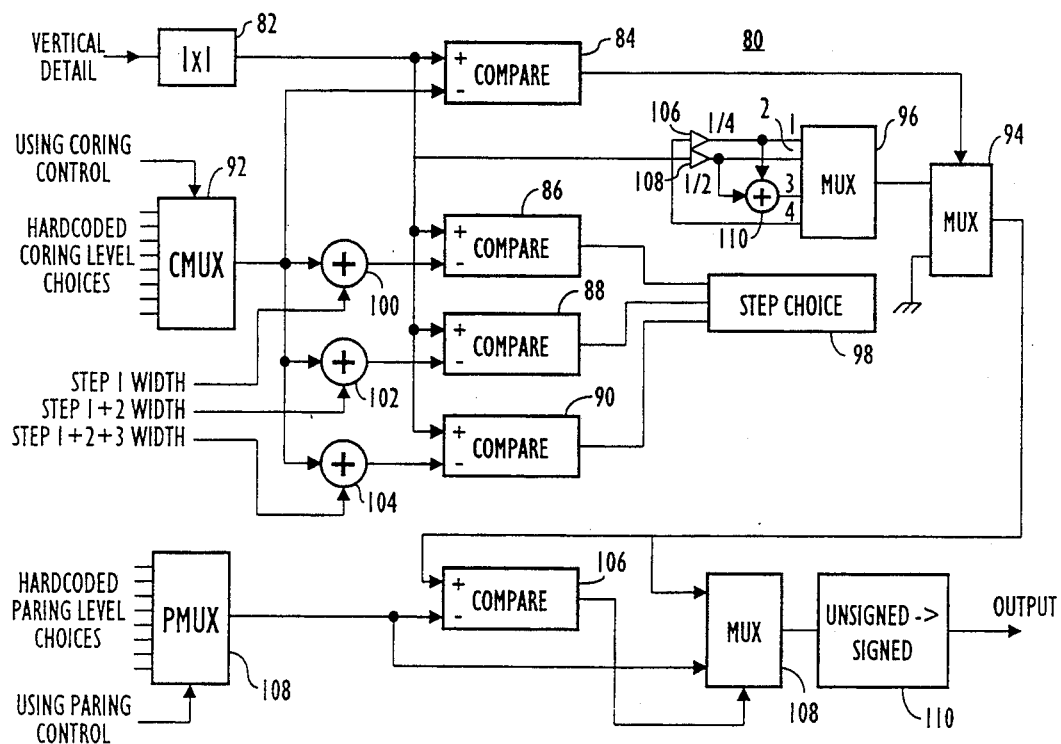
FIG. 6 illustrates a digital vertical detail modifying circuit having the transfer characteristic shown in FIG. 5.

With the above background in mind, reference is now made to FIG. 6 of the drawings, wherein a digital vertical detail modifying circuit 80 having the transfer characteristic shown in FIG. 5 comprises an input unit 82 that receives a vertical detail signal supplied for example by the vertical detail processing unit 44 (FIG. 2b). As discussed above, the amplitude of the vertical detail signal may have positive or negative value. Therefore, the input unit 82 determines the vertical detail value as the absolute value of the vertical detail signal amplitude and supplies the vertical detail value to positive inputs of comparators 84, 86, 88 and 90. A negative input of the comparator 84 is coupled to a coring multiplexer 92 having its user coring control input that enables a user to select a coring level among a plurality of hardcoded coring level at the coring multiplexer inputs.

If the vertical detail value is lower than the selected coring level supplied to the comparator 84, a multiplexer 94 coupled to the output of the comparator 84 is disabled to eliminate the vertical detail signal at the output of the modifying circuit in the coring region 72. When the vertical detail value exceeds the selected coring level, the multiplexer 94 is enabled to pass the output signal of a multiplexer 96 controlled by a step choice unit 98.

As indicated above, the positive inputs of the comparators 86, 88 and 90 having their outputs coupled to the step choice unit 98 are supplied with the vertical detail value. Negative inputs of the comparators 86,88 and 90 are respectively supplied by adders 100, 102 and 104 with the values that define the steps 1, 2 and 3 of the transition region 74 in FIG. 5. More specifically, the adder 100 determines the sum of the coring level and the width of step 1 selected by the user. The adder 102 adds the coring level value to the total width of steps 1 and 2 selected by the user. The adder 104 determines the sum of the coring level and the total width of steps 1, 2 and 3 selected by the user.

While the vertical detail value is less than any of the values at the negative inputs of the comparators 86–90, the step choice unit 98 enables the input 1 of the multiplexer 96 to be transferred to the output of the multiplexer 94. The input 1 is coupled to a divider 106 that divides the vertical detail value by 4 to provide the output value of the modifying circuit 80 in the step region 1 equal to 25% of the vertical detail value at its input.

When the vertical detail value exceeds the sum of the coring level and step 1 width, the step choice unit 98 in response to the signal from comparator 86 causes the multiplexer 96 to couple its input 2 to the output of multiplexer 94. The input 2 is supplied by a divider 108 that divides the vertical detail value by 2 to provide the output value of the modifying circuit 80 in the step region 2 equal to 50% of the vertical detail value.

When the vertical detail value exceeds the sum of the coring level and total width of the steps 1 and 2, the output of the comparator 88 causes the step choice unit 98 to connect input 3 of the multiplexer 96 to the output of the multiplexer 94. The input 3 is supplied by an adder 110 with the sum of the output values of the dividers 106 and 108 equal to ¾ of the vertical detail value to provide the output value of the modifying circuit 80 in the step region 3 equal to 75% of the vertical detail value.

When the vertical detail value is higher than the value at the negative input of the comparator 90, the step choice unit enables input 4 of the multiplexer 96 to supply the vertical detail value through the multiplexer 94 to the output of the modifying circuit 80 in the active region 76. No modification is provided.

The multiplexer 94 supplies its output signal to a positive input of a comparator 96 that has its negative input coupled to a paring multiplexer 108. A user paring control input of the paring multiplexer 108 enables the user to select any one of a plurality of hardcoded paring levels at the paring multiplexer inputs.

While the output value of the multiplexer 94 is lower than the selected paring level supplied to the comparator 106, a multiplexer 108 having its control input coupled to the comparator 106 supplies the output value of the multiplexer 94 to the output of the vertical detail circuit 80. A sign detector 110 coupled between the multiplexer 108 and the circuit output provides the output value of the multiplexer 108 with the sign indicated by the input unit 82 to form the output signal of the vertical detail modifying circuit 80 having the same sign as the input vertical detail signal.

When the vertical detail value at the output of the multiplexer 94 exceeds the selected paring level, the comparator 106 causes the multiplexer 108 to replace the vertical detail value at its output with the paring level value to provide the output signal of the circuit 80 at the paring level (in the paring region 78). The sign of the signal restricted at the paring level is provided by the sign detector 110 in accordance with the sign of the input vertical detail signal.

The modified vertical detail signal may be supplied by the circuit 80 to the final variable-gain amplifier (e.g. amplifier 48 shown in FIG. 2b) before adding to the luminance component of the composite video signal to provide the enhanced luminance signal.

There accordingly has been described a digital vertical detail enhancement system having the transfer characteristic with a lower slope in the transition region to reduce amplification of noise exceeding the coring level. The system provides an adjustable coring level to suppress noise at different predicted levels and provides adjustable paring level and width of the transition region to customize the transfer characteristic. The transfer characteristic of the digital vertical detail enhancement system has the transition region split into three steps with the customized widths and slopes.

In this disclosure, there is shown and described only the preferred embodiment of the invention, but it is to be understood that the invention is capable of changes and modifications within the scope of the inventive concept as expressed herein.

I claim:

1. Apparatus for enhancing a luminance component of a video signal comprising:
    means for supplying a vertical detail signal representative of variations in the luminance of the video signal in successive horizontal scan lines,
    means responsive to said supplying means for processing said vertical detail signal to form a modified signal having an amplitude represented by a sequence of steps with variable slopes, and
    means for adding the output of said processing means to said luminance component to generate an enhanced luminance signal,
    wherein said processing means comprises
        coring means responsive to said supplying means for suppressing said vertical detail signal having the amplitude lower than a first predetermined level, and
        first modifying means responsive to said supplying means for attenuating by a first predetermined value said vertical detail signal having the amplitude higher than said first predetermined level but lower than a second predetermined level.

2. The apparatus of claim 1, wherein said processing means further comprises second modifying means responsive to said supplying means for attenuating by a second predetermined value said vertical detail signal having an amplitude higher than said second predetermined level but lower than a third predetermined level.

3. The apparatus of claim 2, wherein said processing means comprises third modifying means responsive to said supplying means for attenuating by a third predetermined value said vertical detail signal having the amplitude higher than said third predetermined level but lower than a fourth predetermined level.

4. The apparatus of claim 3, wherein said processing means transfers without modifications said vertical detail signal having an amplitude higher than said fourth predetermined level but lower than a fifth predetermined level.

5. The apparatus of claim 4, wherein said processing means comprises paring means for restricting said vertical detail signal having an amplitude higher than said fifth predetermined level.

6. The apparatus of claim 5, wherein said processing means comprises comparing means for comparing the amplitude of said vertical detail signal with said predetermined levels.

7. The apparatus of claim 5, wherein said processing means comprises selecting means for selecting said predetermined levels from among a plurality of preset levels.

8. The apparatus of claim 3, wherein said third modification means supplies said modified signal having an amplitude equal to 75% of that of the vertical detail signal to form a third step of said sequence of steps.

9. The apparatus of claim 2, wherein said second modifying means supplies said modified signal having an amplitude equal to 50% of that of the vertical detail signal to form a second step of said sequence of steps.

10. The apparatus of claim 1, wherein said first modifying means supplies said modified signal having an amplitude equal to 25% of that of said vertical detail signal to form a first step of said sequence of steps.

11. A digital video signal processor comprising:
a source of vertical detail signals representative of contrasts between successive horizontal lines of a video signal,
a translating circuit coupled to said source for modifying said vertical detail signals, and
a control circuit coupled to said translating circuit for supplying said translating circuit with a predetermined coring level to eliminate said vertical detail signals having an amplitude lower than said coring level, a predetermined paring level to restrict the value of said vertical detail signals having the amplitude higher than said paring level, and predetermined step levels between said coring level and said paring level to reduce the value of said vertical detail signals having the amplitude lower than said predetermined step levels.

12. The processor of claim 11, wherein said control circuit comprises an adjustment circuit for adjusting said predetermined coring and paring levels.

13. The processor of claim 11, wherein said predetermined step levels include a first level higher than said coring level, a second level higher than said first level, and a third level higher than said second level but lower than said paring level.

14. The processor of claim 13, wherein the output signal of said translating circuit comprises a first step when the amplitude of the vertical detail signals is higher than said coring level but lower than said first level, a second step when the amplitude of the vertical detail signals is higher than said first level but lower than said second level, and a third step when the amplitude of the vertical detail signals is higher than said second level but lower than said third level.

15. The processor of claim 14, wherein the slope of said second step is higher than the slope of said first step but lower than the slope of said third step.

16. A method of processing a vertical detail signal representative of contrasts between successive horizontal lines of a video signal comprising the steps of:
suppressing said vertical detail signal having the amplitude lower than a predetermined coring level,
restricting said vertical detail signal having the amplitude higher than a predetermined paring level,
transforming said vertical detail signal having the amplitude higher than a predetermined coring level but lower than a maximum step level into a step-like modified signal having a plurality of step components with variable amplitudes, a first of said step components being formed when said vertical detail signal has the amplitude lower than a first step level, said maximum step level being lower than said paring level, and
passing without modification said vertical detail signal having the amplitude higher than said maximum step level but lower than said paring level.

17. The method of claim 16, wherein said step of transforming comprises forming a second of said step components when said vertical detail signal has an amplitude higher than said first step level but lower than a second step level.

18. The method of claim 17, wherein said step of transforming comprises forming a third of said step components when said vertical detail signal has an amplitude higher than said second step level but lower than said maximum step level.

19. The method of claim 18, wherein the amplitude of said second of step components is higher than the amplitude of the first of the step components but lower than the amplitude of the third of said components.

20. The method of claim 19, wherein the amplitude of said vertical detail signal is higher than the amplitude of the third of said components.

21. The method of claim 17 further comprising the step of adjusting said first and second step levels.

22. The method of claim 16 further comprising the step of adjusting said coring and paring levels.

* * * * *